United States Patent [19]
Warth

[11] Patent Number: 5,975,574
[45] Date of Patent: Nov. 2, 1999

[54] AUXILIARY PROPANE FUEL TANK SYSTEM FOR VEHICLES

[75] Inventor: Mitchell W. Warth, Arcola, Ill.

[73] Assignee: Spare Tank Co., Inc., Fort Lee, N.J.

[21] Appl. No.: 09/103,425

[22] Filed: Jun. 24, 1998

[51] Int. Cl.$^6$ ................................................. B60P 3/22
[52] U.S. Cl. ........................................................... 280/834
[58] Field of Search ........................... 280/830, 834; 137/572; 62/53.2

[56] References Cited

U.S. PATENT DOCUMENTS

| | | | |
|---|---|---|---|
| 3,893,678 | 7/1975 | Engdahl | 280/5 A |
| 5,330,031 | 7/1994 | Hill et al. | 180/271 |
| 5,718,260 | 2/1998 | Leonardi | 137/572 |

*Primary Examiner*—Lanna Mai
*Assistant Examiner*—Jeff Restifo
*Attorney, Agent, or Firm*—Banner & Witcoff, Ltd.

[57] ABSTRACT

An auxiliary fuel tank system includes a permanent pressure tank for natural gas or propane is mounted on a vehicle such as a fork lift truck. The auxiliary tank is connected through fuel lines to a replaceable portable tank which supplies fuel to the auxiliary tank through check valves and a valve mechanism which may be turned on and off. The auxiliary tank is filled upon initial attachment of the portable tank to the fuel line for the truck. After filling the auxiliary tank, the valve mechanism is closed only to be reopened upon exhaustion of fuel from the portable tank. Fuel lines connect the respective tanks to the engine thereby permitting operation of the engine, even upon exhaustion of fuel from the portable, replaceable tank.

3 Claims, 2 Drawing Sheets

AUXILIARY PROPANE FUEL TANK SYSTEM FOR VEHICLES

BACKGROUND OF THE INVENTION

This invention relates to an auxiliary fuel system for vehicles such as fork lift trucks and the like.

Fork lift trucks typically use pressurized tanks filled with propane gas (or natural gas) as a fuel source to operate the internal combustion engine of the vehicle. The use of propane gas or natural gas for such vehicles is desirable in order to reduce or control emissions of combustion products in their usefull environment such as warehouses and the like. Typically, a pressurized, propane gas tank is mounted on a lift truck, for example, and attached to a fuel line that, in turn, is connected to the internal combustion engine of the lift truck. The pressurized fuel tank is typically removable and replaceable and includes enough pressurized fuel to operate the truck for a full shift or an eight hour day. However, the operator of the lift truck cannot always predict when and where the fuel in the tank will be consumed and exhausted. Thus, it may be necessary to tow the lift truck back to a refueling center where the empty propane fuel tank is removed and replaced by a full tank. Alternatively, the empty propane fuel tank from the fork lift truck may be removed and carried to a filling station for refilling and return.

In review, on standard fork lift trucks in most warehouses in the United States, the usual fuel utilized by the truck is propane gas and/or natural gas. The gas is provided from a refillable portable tank which is supported or mounted on the truck and which is replaced from time to time as the tank becomes empty. For maximum utilization, a lift truck is operated until its tank becomes empty. At that time, the operator typically removes the empty tank and physically carries it to a storage area where it is exchanged for a full tank and carried back to the lift truck, mounted on the truck, and attached to the proper fuel line. Alternatively, the lift truck can be towed to the fuel tank storage area.

In any event, fuel tank replacement is a time consuming job and may take upwards of thirty minutes in order to complete. Consequently, a system devised to reduce the time for exchanging fillable portable fuel tanks for lift trucks and for other vehicles is desirable. Thus, there has developed a need for an improved fueling system for fork lift trucks and other vehicles such as prime movers, automobiles, trucks and buses, and vehicles of the type which use propane gas or natural gas provided from a pressurized portable or replaceable fuel tank.

SUMMARY OF THE INVENTION

Briefly, the present invention comprises an auxiliary fuel tank which is maintained permanently on board a vehicle such as a lift truck. The tank is connected through a fill line to the fuel feed line that normally provides fuel to the engine from a portable, replaceable, main, fuel tank. The connection to the fuel feed line is through a tee connection, or tee. A check valve permits fuel in the fuel feed line from the portable fuel tank to flow unidirectionally into the auxiliary fuel tank when the portable tank is initially attached or mounted on the vehicle. Once the fuel pressure in the auxiliary tank and the portable tank are equalized (indicating that the auxiliary tank has been substantially filled with propane or natural gas) a valve mechanism is operated to isolate the auxiliary fuel tank from the fuel feed system to the engine. The valve mechanism remains in the "off" position until the portable, main fuel tank supply is exhausted. Thereafter, the valve mechanism is opened and a fuel line from the auxiliary tank feeds fuel into the engine directly through a separate line or through the main fuel feed line. This enables the truck operator to continue operation of the lift truck for a short time period and also permits the operator to move the truck to a refueling station where the portable fuel tank may be replaced. The capacity of the auxiliary fuel tank is typically at least 2% of the capacity of the portable fuel tank, but less than 10%. This enables the vehicle or truck to have an auxiliary fuel supply for at least 10–15 minutes of operation thus permitting an operator in a warehouse adequate time to move the vehicle expeditiously to a refueling center.

Thus, it is an object of the invention to provide an auxiliary fuel tank system for fork lift truck and other vehicles.

It is a further object of the invention to provide an auxiliary fuel tank system which is permanently mounted on a vehicle, such as a fork lift truck, and which provides an isolated supply of auxiliary fuel available upon the exhaustion of fuel from a replaceable, portable, main fuel tank that is mounted on the vehicle.

A further object of the invention is to provide an auxiliary fuel tank which is automatically filled upon placement of a portable fuel tank on the vehicle with the opening of a manual valve interconnecting the portable tank and the auxiliary fuel tank.

Yet, another object of the invention is to provide an auxiliary fuel tank which is isolated by means of a manually operated valve mechanism subsequent to being filled from a portable fuel tank through interconnecting lines that connect to the auxiliary tank as well as the engine of the vehicle.

Yet another object of the invention is to provide an auxiliary fuel tank system which is economical, easy to manufacture and incorporate in existing vehicles, easy to operate and which enables an operator to easily inject auxiliary fuel into an internal combustion engine system of a vehicle upon exhaustion of fuel from a portable, main fuel tank.

These and other objects, advantages and feature of the invention will be set forth in the detailed description which follows.

BRIEF DESCRIPTION OF THE DRAWING

In the detailed description as follows, reference will be made to the drawing comprising the following figures.

DESCRIPTION OF THE PREFERRED EMBODIMENTS

Figure 1:
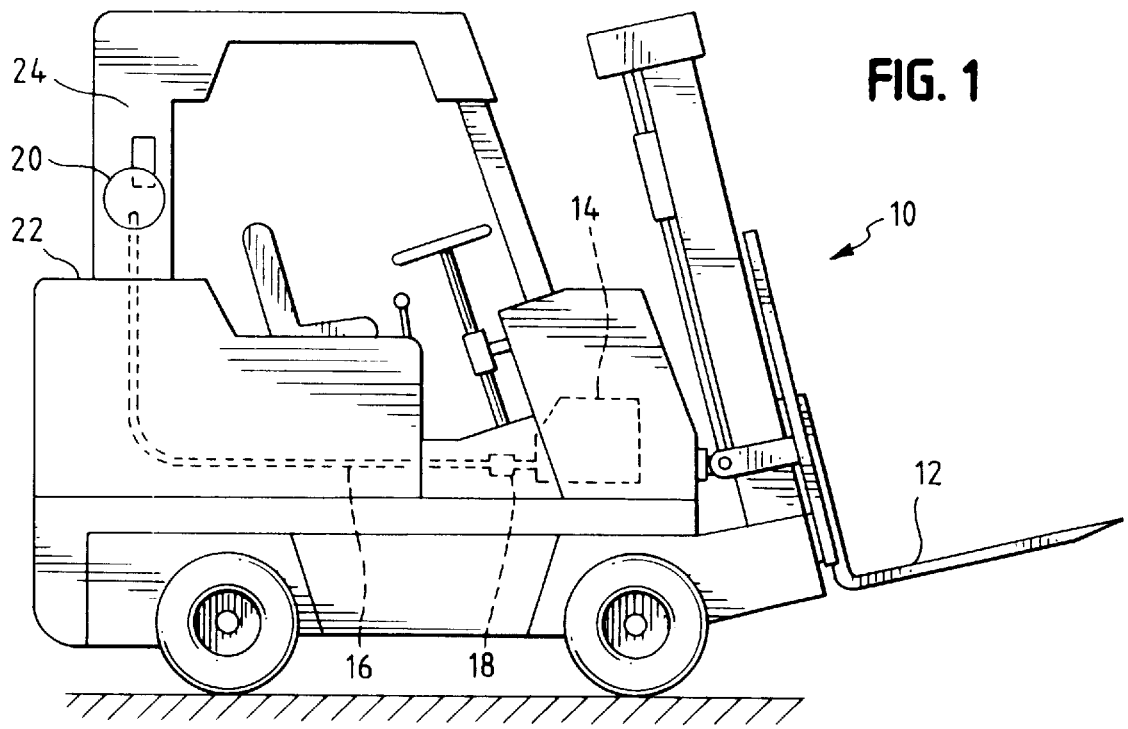
FIG. 1 is an isometric view of a typical lift truck incorporating a portable, main fuel tank as well as the permanent auxiliary fuel tank and interconnecting lines, valves and other mechanism associated therewith.

FIG. 1 depicts a typical fork lift truck 10 of the type which utilizes propane gas cylinders or tanks as a source of the fuel for the internal combustion engine which drives the truck. Thus, a truck 10 includes a fork lift mechanism 12. The fork lift truck 10 also includes an internal combustion engine, schematically illustrated as engine 14. A fuel line 16 provides propane fuel through a regulator 18 from a portable, removable, main propane tank 20. Typically the tank 20 will include adequate propane fuel or natural gas fuel for operating the engine 14 of the fork lift truck 10 for a full eight hours in a warehouse environment. The tank 20 is removably mounted on a deck 22 of the truck 10 and is thus replaceable whenever fuel is exhausted therefrom. In addition, the fork lift truck 10 includes a bracket or cage 24 on deck 22. The bracket or cage 24 serves multiple functions of providing roll bar protection for the operator of the truck 10, a mount for auxiliary fuel tank as described below, and protection for the main tank 20.

Permanently mounted on the bracket or cage 24 is an auxiliary or spare fuel tank 26. The auxiliary tank 26 is connected with the removable or portable tank 20, as described in greater detail hereinafter. Various embodiments of the connections between the portable tank 20, the permanent auxiliary or spare tank 26 and the engine 14 are described.

Figure 2:
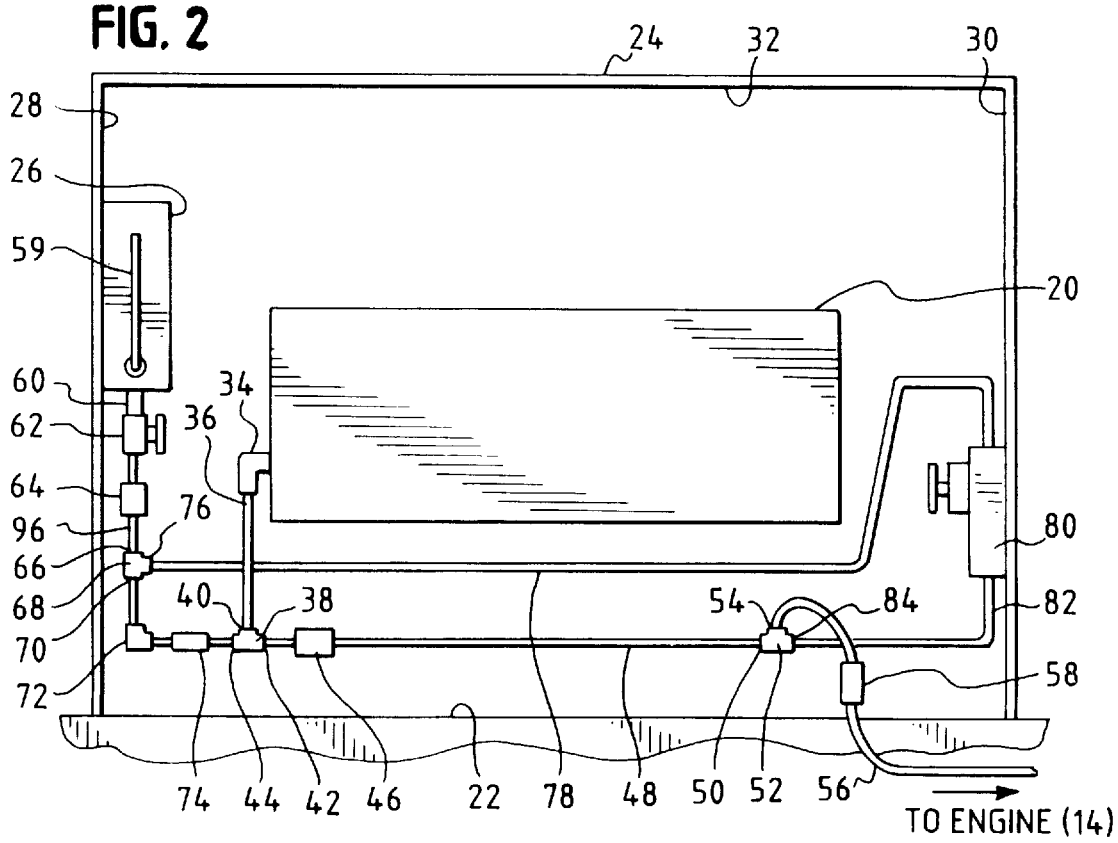
FIG. 2 is a diagrammatic view of a first embodiment of the auxiliary fuel tank system of the invention.

FIG. 2 illustrates a first embodiment of the invention. The cage or bracket 24 includes opposed, spaced uprights 28 and 30 and a top, protective cross brace 32. Tank 20, which is the removable or portable tank, is positioned intermediate the uprights 28 and 30 and beneath the cross bracket or brace 32 on the deck 22. In this fashion, the portable tank 20 is protected in the event of rollover or some other accident which might expose the tank 20. Thus, tank 20 is mounted in a typical manner on the fork lift truck 10 with a connection fitting 34 adapted for connection with a fuel line 36 to the engine 14. Typically the fitting 34 includes a manually operable valve which remains closed until connected to the line 36. The fitting 34 may also have a quick connect feature.

The line 36 is connected to a tee 38. The tee 38 includes an inlet 40, a first outlet 42 and a second outlet 44. The first outlet 42 connects through a unidirectional check valve 46 which provides for fuel flow in the direction indicated by the arrow in FIG. 2. The check valve 46 feeds into main fuel line 48 which, in turn, connects through an inlet 50 of a tee 52. The tee 52 includes an outlet 54 connected to engine fuel line 56 which connects through a regulator 58 that controls fuel pressure to engine 14.

The spare or auxiliary tank 26 is permanently mounted on an upright 28. A draw tube 59 extends into tank 26. The auxiliary tank 26 further includes a high pressure release valve 60 designed to release the pressure from the tank 26 in the event the pressure exceeds a predetermined value. The tank 26 further includes a manual shut off valve 62 connected to the high pressure relief valve 60. A safety collar 61 on the tank 26 protects the valve 60 and valve 62. The manual shut off valve 62 is normally maintained in the open position and is an extra safety feature. An auxiliary fuel line 96 connects from valve 62 to an inlet 66 of a tee 68. The tee 68 further includes an inlet 70 through line 72 from the outlet 44 of tee 38. Intermediate the outlet 44 in fuel line 72 is a check valve 74. Check valve 74 permits unidirectional flow therethrough to the auxiliary tank 26 by way of the tee 68.

The tee 68 further includes an outlet 76 connected to an auxiliary fuel line 78 that is directed through a valve mechanism 80 having an outlet line 82 to inlet 84 of the tee 52. Normally, the valve mechanism 80 is in the closed position so that when the portable tank 20 is attached to the system, propane fuel will flow through the check valve 74 into the tank 26 and pressurize the tank 26. The auxiliary fuel line 78 will also be pressurized, but fuel will not be able to flow to the regulator 58 through line 78. However, propane from the portable tank 20 will also flow through the check valve 46 and through the regulator 58 via the described line 48, tee 52 and line 58.

When the fuel in tank 20 is exhausted, the operator of the fork lift truck or the vehicle merely opens the valve mechanism 80. This permits auxiliary fuel to flow through that valve 80 and through the tee 52 to the regulator 58 and then to the engine 14. The check valve 46 will prevent back flow into the tank 20 as will the check valve 74. The auxiliary fuel tank 26 may thus be utilized to provide fuel to the engine 14 until tank 20 is replaced. When the tank 20 is to be removed, the valve mechanism 80 is closed. The propane tank 20 is removed and replaced. Upon replacement of propane tank 20, valve mechanism 80 is closed and fuel will then flow through check valve 74 into the auxiliary fuel tank 26 permanently mounted on upright 28. In this manner, the fuel in the auxiliary tank 26 is replenished after usage and subsequent to exhaustion of the fuel in the removable, portable tank 20. After tank 26 is filled as described, the system is ready for operation.

Figure 3:
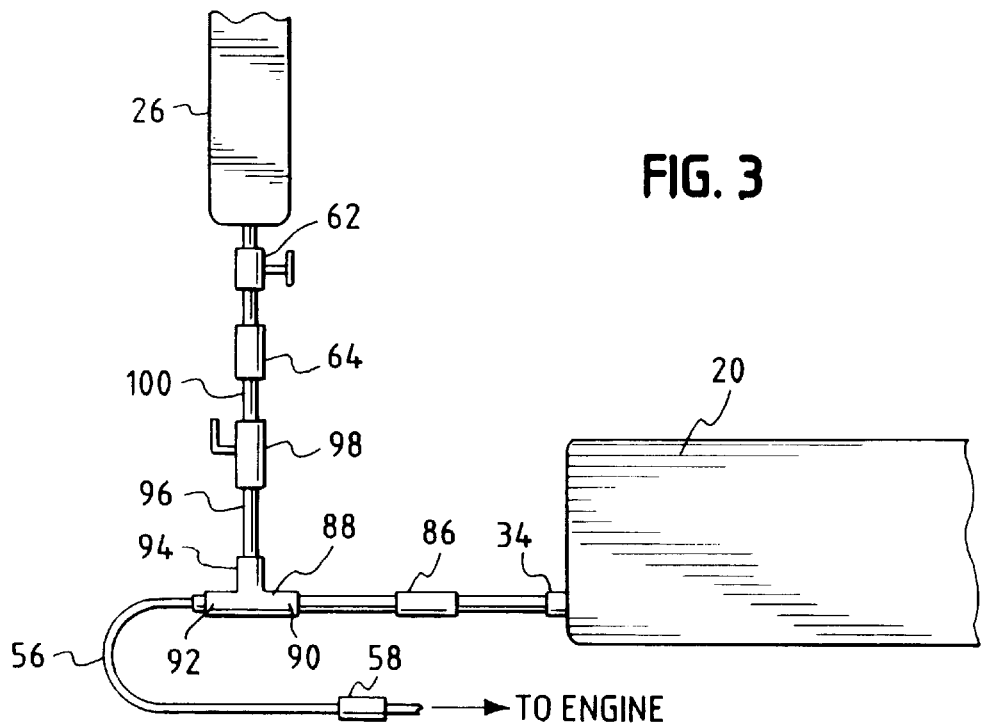
FIG. 3 is a diagrammatic view of a second embodiment of the auxiliary fuel tank system of the invention.
Figure 4:
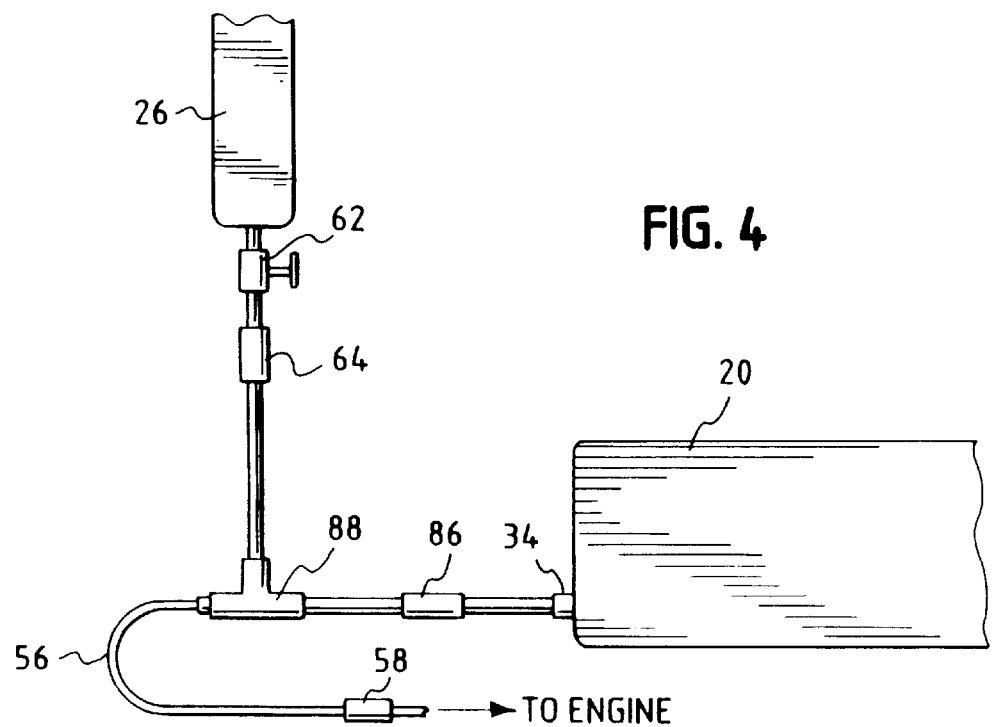
FIG. 4 is a diagrammatic view of a third embodiment of the auxiliary fuel tank system of the invention.

FIG. 3 discloses a second embodiment of the auxiliary fuel system of the invention. In FIG. 3, like components are labeled with like numbers. Thus, replaceable, portable tank 20 connects through a connection fitting 34. Auxiliary fuel tank 26 is mounted on an upright (not shown), The emergency shut off valve 62 is combined with a high pressure relief valve 64. The fuel from the tank 20 as well as the tank 26 ultimately feeds into a fuel line 56 that connects with a fuel regulator 58 in the line connected to the engine 14. In the embodiment of FIG. 3, however, the main portable tank 20 connects through a check valve 86 and a tee 88 having an inlet 90 and an outlet 92 to the line 56. The other outlet or branch 94 of the tee 88 is connected to the auxiliary tank 26 through a line 96 manual valve mechanism 98 and line 100. With the design of FIG. 3, the manual valve mechanism 98 is maintained in the open position upon initial attachment of the propane or natural gas tank 20. Gas will then flow through the check valve 86 and through the manual valve 98 to fill the auxiliary or spare tank 26. Valve 98 may then be closed. Fuel will likewise thus flow through the tee 88 to the regulator 58 to provide fuel to the engine 14. When fuel is exhausted in tank 20, valve mechanism 98 is open to permit fuel to flow through the tee 88 to the regulator 28. Check valve 86 prevents back flow into the tank 20. The cylinder or tank 20 may then be replaced. FIG. 4 illustrated yet a further embodiment of the invention wherein like components are labeled with like numbers. Thus, the portable, replaceable tank 20 provides fuel through a connection 34 and a check valve 86 to a tee 88 connected to a line 56 feeding into a regulator 58 in the fuel line to the engine 14. Auxiliary tank 26 connects through an emergency shut off 62 and a high pressure release valve 64 to the tee 88. In this circumstance, the emergency shut off valve 62 is maintained in the open position upon initial attachment of the portable tank 20 to the system. Thereafter, the emergency shut off valve 62 should be turned to the "off" position until auxiliary fuel is required. When auxiliary fuel is required, the valve mechanism or shut off 62 is opened to provide auxiliary fuel through the regulator 58. Again, check valve 86 precludes back flow of fuel into the tank or cylinder 20.

With the present invention, the size of the spare or auxiliary fuel tank 26 is designed and provided to include, at least typically, more than about 2% of the volume of gas stored in the portable tank 20. Preferably, approximately 8% to 10% of the fuel would be maintained in the auxiliary tank 26. The auxiliary tank 26 also may include an indicator which indicates the amount of fuel retained therein and the pressure of the fuel. The spare tank 26 may be mounted on the inside of the upright, to further enhance the installation safety of the auxiliary tank system. The high pressure relief valve 64 need not necessarily be included in the outlet line of the tank 26. It can be attached at some other outlet opening from the tank 26. With the described system, down time previously allotted for portable tank 20 replacement is significantly reduced, resulting in operating cost savings and increased operating efficiency.

It is possible to vary the construction of the fuel tank system without departing from the spirit and scope of the invention. The system can be incorporated in other types of vehicles other than fork lift trucks. However, it is especially appropriate and useful in combination with a fork lift truck of the type using propane or natural gas as a fuel. Thus, while there has been set forth preferred embodiments of the invention, it is to be understood that the invention is limited only by the following claims and equivalents thereof.

What is claimed is:

1. A pressurized propane or natural gas fuel tank system having an auxiliary fuel source for a vehicle having an internal combustion engine, said vehicle from a group comprising fork lift trucks, prime movers, automobiles, trucks and buses, said system comprising, in combination:

a replaceable main fuel tank for maintaining said pressurized fuel said main tank; removably mountable on the vehicle by means for removably mounting the main tank;

a main fuel line from the main tank connecting to the engine of the vehicle, said fuel line removably connected to the main tank;

a first tee in said main fuel line having an inlet from the main tank and further having two outlets, one of said outlets connected to the fuel line to the engine;

an auxiliary pressurized fuel tank permanently mounted on the vehicle, said auxiliary tank having a single fuel inlet means;

an auxiliary fuel line connecting from the other tee outlet to the auxiliary tank through the single fuel inlet means;

a valve mechanism in the auxiliary fuel line operable to open and close the auxiliary fuel line from the tee to the single inlet mean; and at least one check valve in the main fuel line intermediate the tee and the replaceable tank to prevent flow back of pressurized gas fuel into the replaceable tank whereby the valve mechanism is operable to an open position to simultaneously allow fuel flow to the engine and into the auxiliary tank through the single inlet means from the replaceable tank to at least partially fill the auxiliary tank with pressurized fuel, said valve mechanism operatable to close and isolate the auxiliary tank from connection with the replaceable tank, said valve mechanism being further operable to open when the replaceable tank is exhausted of fuel to thereby connect the auxiliary tank to the engine through the single inlet means, the fuel from the auxiliary tank being blocked from flow into the main tank by the check valve while flowing out of the single fuel inlet means of the auxiliary tank through the tee to the engine.

2. The system of claim 1 including a fuel pressure regulator in the fuel line to the engine.

3. The system of claim 1 wherein the valve mechanism is manually operable.

\* \* \* \* \*